(12) United States Patent
Houser et al.

(10) Patent No.: US 6,617,040 B2
(45) Date of Patent: Sep. 9, 2003

(54) CHEMOSELECTIVE DENDRIMERIC COMPOUNDS FOR USE IN CHEMICAL SENSORS

(75) Inventors: Eric Houser, Nokesville, VA (US); Robert McGill, Lorton, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/046,298

(22) Filed: Jan. 16, 2002

(65) Prior Publication Data

US 2003/0135005 A1 Jul. 17, 2003

(51) Int. Cl.$^7$ .............................. B32B 9/04; C08G 77/60
(52) U.S. Cl. ........................... 428/447; 438/50; 528/25; 528/31; 528/35
(58) Field of Search ............................. 528/25, 31, 35; 428/447; 438/50

(56) References Cited

U.S. PATENT DOCUMENTS

| | | | |
|---|---|---|---|
| 5,648,186 A | 7/1997 | Daroux et al. | 429/192 |
| 5,938,934 A | 8/1999 | Balogh et al. | 210/688 |
| 6,020,457 A | 2/2000 | Klimash et al. | 528/373 |
| 6,060,327 A | 5/2000 | Keen | 436/518 |
| 6,093,777 A | 7/2000 | Sorensen et al. | 525/438 |
| 6,312,809 B1 * | 11/2001 | Crooks et al. | 428/411.1 |

OTHER PUBLICATIONS

"Hydrogen Bond Acidic Polymers for Surface Acoutstic Wave Vapor Sensors and Arrays"; Grate et al., Anal. Chem. 1999, 71, 1033.*

"Sorbent Coatings for Nitroaromatic Vapors: Applications with Chemical Sensors"; McGill et al., proceedings from SPIE Conference on Detection and Remediation Technologies for Mines and Minelike Targets (Apr. 1998), p. 384.*

"Rational Design of a Nile Red/Polymer Composite Film for Fluorescence Sensing of Organophosphonate Vapors Using Hydrogen Bond Acidic Polymers"; Levitsky et al., Anal. Chem., 2001, 73, 3441.*

"Multiple Multicenter Reactions of Perfluoro Ketones with Olefins"; Urry et al., J. Org. Chem. (1968) 2302.*

* cited by examiner

Primary Examiner—Robert Dawson
Assistant Examiner—Marc S Zimmer
(74) Attorney, Agent, or Firm—Rebecca L. Forman; John J. Karasek

(57) ABSTRACT

The present invention provides a device for selective molecular recognition, the device comprising a sensing portion, wherein said sensing portion includes a substrate having coated thereon a layer comprising a dendrimeric compound having:

(1) a core portion;
(2) at least one unsaturated arms extending radially from the core portion; and
(3) at least one halogen substituted alcohol substituted at the terminus, the interior, or both of each;

The device is used to detect the molecules of a hydrogen bond accepting vapor such as organophosphorus or nitroaromatic species.

27 Claims, 2 Drawing Sheets

$E = -C(CF_3)_2OH$

E = -C(CF$_3$)$_2$OH

E = -C(CF$_3$)$_2$OH

CHEMOSELECTIVE DENDRIMERIC COMPOUNDS FOR USE IN CHEMICAL SENSORS

BACKGROUND OF THE INVENTION

1. Field of the Invention

The present invention relates to the detection of noxious chemical species by means of chemoselective dendrimeric compounds. More particularly, the invention relates to the detection of toxic or explosive chemical vapors, such as chemical agents or nitroaromatic species, by sorbent materials comprising chemoselective dendrimeric molecules.

2. Description of Related Art

Determining and/or monitoring the presence of certain chemical species within an environment, e.g., pollutants, toxic substances and other predetermined compounds, is becoming of increasing importance with respect to such fields as health, environmental protection, resource conservation, and chemical processes. Devices for the molecular recognition of noxious species or other analytes typically include (1) a substrate and (2) a molecular recognition coating upon the substrate. These devices may be used, for example, in chemical vapor sensing or the selective separation of gases by gas chromatography. Small molecular recognition devices are described in Grate et al., *Sensors and Actuators B*, 3, 85–111 (1991) and Grate et al., *Analytical Chemistry*, Vol. 65, No. 14, Jul. 15, 1993, both of which are incorporated herein by reference.

Frequently, the substrate is a piezoelectric material or a waveguide, which can detect small changes in mass. One illustrative example of a device relying upon molecular recognition as a surface is known as a surface acoustic wave (SAW) sensor. SAW devices function by generating mechanical surface waves on a thin slab of a piezoelectric material, such as quartz, that oscillates at a characteristic resonant frequency when placed in a feedback circuit with a radio frequency amplifier. The oscillator frequency is measurably altered by small changes in mass and/or elastic modulus at the surface of the SAW device.

SAW devices can be adapted to a variety of gas-phase analytical problems by designing or selecting specific coatings for particular applications. The use of chemoselective polymers for chemical sensor application is well established as a way to increase the sensitivity and selectivity of a chemical sensor with respect to specific classes or types of analytes. Typically, a chemoselective polymer is designed to contain functional groups that can interact preferentially with the target analyte through dipole-dipole, Van der Waal's, or hydrogen bonding forces. For example, strong hydrogen bond donating characteristics are important for the detection of species that are hydrogen bond acceptors, such as toxic organophosphorus compounds. Increasing the density of hydrogen bond acidic binding sites in the coating of a sensor results in an increase in sensitivity.

Chemoselective films or coatings used with chemical sensors have been described by McGill et al. in *Chemtech*, Vol. 24, No. 9, 27–37 (1994). The materials used as the chemically active, selectively absorbent layer of a molecular recognition device have often been polymers, as described in Hansani in *Polymer Films in Sensor Applications* (Technomic, Lancaster, Pa. 1995). For example, Ting et al. investigated polystyrene substituted with hexafluoroisopropanol (HFIP) groups for its compatibility with other polymers in *Journal of Polymer Science: Polymer Letters Edition*, Vol. 18, 201–209 (1980) Later, Chang et al. and Barlow et al. investigated a similar material for its use as a sorbent for organophosphorus vapors, and examined its behavior on a bulk quartz crystal monitor device in *Polymer Engineering and Science*, Vol. 27, No. 10, 693–702 and 703–15 (1987). Snow et al. (*NRL Letter Report*, 6120–884A) and Sprague et al. (*Proceedings of the 1987 U.S. Army Chemical Research Development and Engineering Center Scientific Conference on Chemical Defense Research*, page 1241) reported making materials containing HFIP that were based on polystyrene and poly(isoprene) polymer backbones, where the HFIP provided strong hydrogen bond acidic properties. These materials were used as coatings on molecular recognition devices, such as SAW sensors, and showed high sensitivity for organophosphorus vapors. However, both the parent polymers and the HFIP-containing materials were glassy or crystalline at room temperature. Because vapor diffusion may be retarded in glassy or crystalline materials, the sensors produced were slow to respond and recover. Further, these are polymeric materials and, like all polymers, they can vary significantly from batch to batch in precise composition, purity and yield. Additional information is reported in *Polym. Eng. Sci.*, 27, 693 and 703–715 (1987).

Daroux et al., U.S. Pat. No. 5,648,186, issued Jul. 15, 1997, discloses a dendrimeric compounds containing electronegative heteroatoms, such as etheric oxygens, which are capable of associating with the cationic species of a salt. The compounds are useful as components of solid electrolytes for use in solid electrolyte cells. Examples of nucleophilic functional groups are those containing N—H groups, hydroxyl groups, and thiol groups. Examples of nucleofugal groups are compounds containing three or more halogens, tosylates, or other commonly used leaving groups. The core, arm and branch points of the dendrimers are completely aliphatic.

Balogh et al., U.S. Pat. No. 5,938,934 issued Aug. 17, 1999, discloses silicon-containing dendrimer-based networks prepared from radially layered copoly(amidoamine-organosilicon) dendrimers (PAMAMOS), which have a hydrophilic interior and an organosilicon exterior to complex and/or encapsulate metal cations or elemental metals. A hydrophilic PAMAM or PPI dendrimer is formed first, which comprises a polyamide core, and then is reacted with an organosilicon modifier, which forms the outer layer. Some examples of preferred organosilicon modifiers include (3-acryloxypropyl)methyldimethoxysilane, (3-acryloxypropyl)bis(vinyldimethylsiloxy)-methylsilane, iodomethyldimethylvinylsilane, chloromethyldimethylvinylsilane, other (3-acryloxypropyl)-functional silanes, and other haloalkyl-functional silanes.

Klimash et al., U.S. Pat. No. 6,020,456 issued Feb. 1, 2000, discloses the use of polyamidoamine (PAMAM) dendrimers as reagents in optical devices, electrical devices, catalyst systems, sensors and biosensors. The dendrimers are usually synthesized from a reactive initiator core reagent, such as dibenzyl amine, followed by the generation of the degree of additional growth desired to form arms extending radially from the polyamidoamine core. Prior to being combined with the anchoring core, the arms can be individually modified to provide various functional groups, e.g., hydroxyl, mercapto, nitrile, amide, carboxylic, etc. Klimash et al. are particularly interested in dendrimeric compounds having a single disulfide group at the core, which can be reduced to form two sulfhydryl groups, thus splitting the dendrimeric molecule into two parts, each having a single reactive sulfhydryl group to which other molecules can be bound.

The inventors have now discovered a class of dendrimeric molecules that can be used to produce hydrogen bond acidic coatings for chemical sensor applications. Using dendrimers that are highly functionalized results in significant sensitivity improvements. Further, the chemoselective dendrimeric molecules of the present invention exhibit, not only improved sensitivity to organophosphorus species, but also high selectivity and sensitivity toward nitro-substituted chemical vapors, and are thus also useful for detecting the presence of explosives. Conventional explosives, such as trinitrotoluene (TNT), hexahydro-1,3,5-trinitro-1,3,5-triazine (RDX), and octahydro-1,3,5-trinitro-1,3,5,7-tetrazocine(HMX), may be contained in unexploded munitions, e.g., buried below the surface of the ground. Such munitions exude or leak vapors of the explosive. These vapors are typically concentrated in the surrounding soil and then migrate to the surface where they can be detected by the compounds, devices and methods of the invention.

SUMMARY OF THE INVENTION

According to a first aspect of the present invention, there is provided a dendrimeric compound having (1) a core portion; (2) at least one arm extending radially from said core portion; (3) at least one branch extending from each said arm; and (4) each said arm having at least one halogen substituted alcohol positioned at the terminus of at least one of said branches.

According to a second aspect of the invention, there is provided a device for selective molecular detection, the device comprising a sensing portion, wherein the sensing portion includes a substrate having coated thereon a layer, the layer comprising the dendrimeric compound of the invention.

According to another aspect of the invention, there is provided a method of detecting a hydrogen bond accepting vapor, such as a nitroaromatic vapor, comprising the steps of:

(a) contacting the molecules of such a vapor with the sensing portion of the device of the invention;

(b) collecting the molecules in the layer of the device, the molecules altering a specific physical property of the layer; and (c) detecting the amount of change with respect to the physical property from before the contacting step (a) and after the collecting step (b).

According to yet another aspect of the invention, there is provided a solution for preparing a chemical vapor sensor comprising (a) an amount of the dendrimeric compound of the invention effective to enhance the sensitivity of the sensor to hydrogen bond accepting vapors such as chemical agents or nitroaromatic compounds and (b) a solvent for the dendrimeric compound.

DETAILED DESCRIPTION OF THE INVENTION

Figure 1:
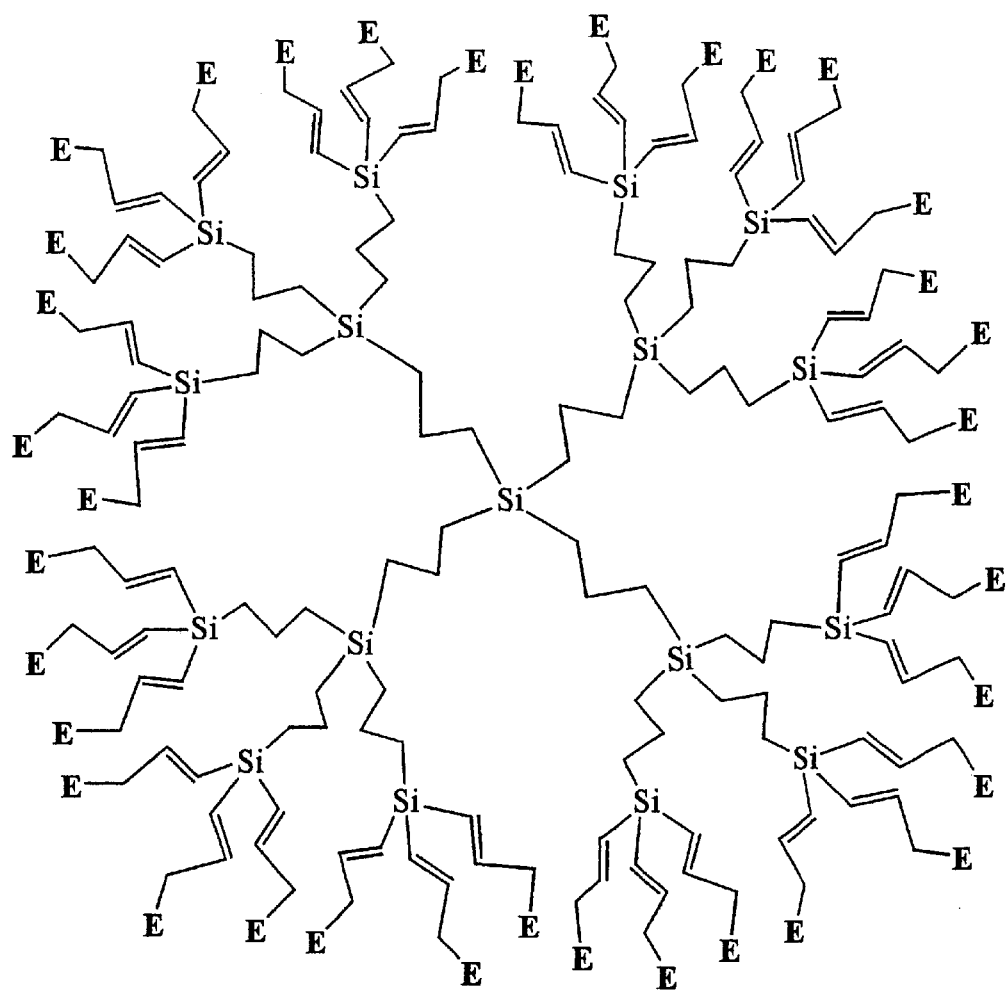
FIG. 1 shows an example of a dendrimeric compound of the invention, here, a carbosilane dendrimer with fluoroalcohol functionalized allyl end groups.

The dendrimeric molecules of the invention are molecular constructions having a branched structure in which at least one extended arm is attached to a core and extends radially away from it. The arms may be composed of both linear and branched units, with all containing at least some branches, and may themselves be further branched, forming, for example, so-called "starburst dendrimers" or monodendrons. Together, the arms comprise the major portion of the mass of the molecule. The chemical structure of the arms or the end groups may dominate certain dendrimer properties. Dendrimers may be distinguished from branched polymers in that:

(a) The arms are long with respect to the size of the core. The ratio of the mean molecular weight of individual arms to the molecular weight of the core should be greater than or equal to one.

(b) The density of the dendrimer is lowest at the core and increases to a maximum at the end groups. There may be a number of repeating units in the arm segments between branch points and, if so, they should be between about 1 and 500, preferably between about 2 and 150, most preferably between about 3 and 50.

Although not bound by theory, it is believed that the dendrimer morphology offers advantages over linear macromolecules with the same or similar repeating units because of the spatial constraints imposed on at least one end of the dendrimer arm segments attached to the core. These constraints, often including steric crowding, inhibit even very long chains from packing in their thermodynamically preferred conformations for crystallization, and thereby lower their melting points due to entropic factors. By controlling the structure of the dendrimer, for example, with suitable ratios of arm length to branch multiplicity, the free volume available to the chain ends can be made relatively large. In this case, a large free volume at the chain ends may facilitate arm segmental motion. However, generally speaking, the synthesis of a dendrimer is often terminated due to steric crowding of the end groups.

The compound of the invention is a dendrimeric compound having (1) a core portion; (2) at least one arm extending radially from said core portion; (3) at least one branch extending from each said arm; and (4) each said arm having at least one halogen substituted alcohol or phenol group positioned at the terminus of at least one of said branches. The compound may be entirely organic or organometallic in composition. Preferred compounds can be represented by the general formula:

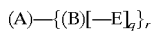

wherein:

A is the core portion;

B is a group extending radially from the core portion;

E is a halogen substituted alcohol;

q is at least 1, preferably ranging from 1 to about 10; and r is at least 1, preferably ranging from 2 to 10.

A, the core portion of the dendrimeric compound, may be: a single atom such as a carbon or a silicon atom; a hydrocarbon moiety; or an organometallic compound or cluster, such as a siloxane, carbosilane, or silylene moiety; or a combination thereof. Examples of useful "A" core fragments include $R_nSi$—$(-Z)_{4-n}$, $R_nC$—$(-Z)_{4-n}$, $(Si-Z-)_8 O_{12}$, $Fe(-C_5Z_5-)_2$, $C_6H_n(-Z)_{6-n}$, and the like, wherein Z is a hydrocarbon, silylene, carbosilane or carbosiloxane fragment of 1 to 20 atoms in length, including but not limited to alkylene, alkenylene, alkynylene, cycloalkylene, cycloalkenylene, arylene, or heterocyclene. Preferably, however, A is $R_nSi$-(alkylene-)$_{4-n}$, $R_nSi$-(arylene-)$_{4-n}$, or $R_n$Si-(alkenylene-)$_{4-n}$. Most preferably, A is Si[(CH$_2$)$_n$]$_4$ wherein n is 2 to 6.

B in the above formula is the group extending radially from the core portion of the compound of the invention. B may be a saturated or unsaturated. By "unsaturated" is meant any site of unsaturation, such as, for example, a double or triple bond or an aromatic ring. B may be entirely hydrocarbon or may contain one or more heteroatoms, such as, for example, Si, N, O, S and the like, and preferably contains further branching entities. For example, B may be —C-(alkenylene)$_3$, —Si-(alkenylene-)$_3$, —N-(alkenylene-)$_2$, or —SiO-(alkenylene-)$_3$, where alkenylene is as defined above; —C-[alkylene-Si-(alkenylene)$_3$]$_3$, —Si-[alkylene-C-(alkenylene)$_3$]$_3$, —Si-[alkylene-Si-(alkenylene$_3$)$_3$, —SiO-[alkylene-Si-(alkenylene)$_3$]$_3$, —CO-[alkylene-Si-(alkenylene)$_3$]$_3$, —Si-[alkylene-N-(alkenylene)$_2$]$_3$, where alkylene and alkenylene are defined as above; —C-(cycloalkenylene-)$_3$, —Si-(cycloalkenylene-)$_3$, and CON-(cycloalkenylene-)$_3$, where cycloalkenylene is defined as above; —C-[cycloalkylene-Si-(alkenylene)$_3$]$_3$, —Si-[cycloalkylene-C-(alkenylene)$_3$]$_3$, —Si-[cycloalkylene-Si-(alkenylene)$_3$]$_3$, —SiO-[cycloalkylene-Si-(alkenylene)$_3$]$_3$, —CO-[cycloalkylene-Si-(alkenylene)$_3$,]$_3$, —Si-[cycloalkylene-N-(alkenylene)$_2$]$_3$, where cycloalkylene and alkenylene are defined as above; —C-(arylene-)$_3$, —Si(arylene-)$_3$, and —SiO-(arylene-)$_3$, where arylene is defined as above; —C-(heterocyclene-)$_3$, —Si-(heterocyclene-)$_3$, and —SiO-(heterocyclene-)$_3$, where heterocyclene is as defined above; —C-[alkylene-Si-(alkylene-arylene)$_3$]$_3$, —Si-[alkylene-C-(alkylene-arylene)$_3$]$_3$, —Si-[alkylene-Si-(alkylene-arylene$_3$)$_3$, —SiO-[alkylene-Si-(alkylene-arylene)$_3$]$_3$, —CO-[alkylene-Si-(alkylene-arylene)$_3$]$_3$, —Si-[alkylene-N-(alkylene-arylene)$_2$]$_3$, where alkylene or arylene are defined as above.

Preferably, however, B is an —Si-[alkylene-Si-(alkenylene)$_3$]$_3$ or an —Si-[alkylene-Si-(alkylene-arylene)$_3$]$_3$ group. Even more preferably, B is either —Si—[(CH$_2$)$_m$—Si—(CH=CH—CH$_2$—)$_3$]$_3$ or Si—{(CH$_2$)$_m$—Si—[—(CH$_2$)$_n$—C$_6$H$_4$-]$_3$}$_3$ wherein m and n are independently 2 to 6.

The novel compounds of the invention are strongly hydrogen bond donating. They are useful in a variety of applications, especially as a coating material on chemical sensors. They are very sensitive for hydrogen bond accepting vapors such as organophosphorus compounds and nitro-substituted compounds such as a number of well-known explosive materials.

The compounds of the invention can be synthesized by reacting hexafluoroacetone with the parent molecule, comprising a core A and a number of pendant unsaturated groups, taking advantage of the reactivity of perfluoroketones with terminally unsaturated groups, as described by Urry et al., *J. Org. Chem.*, Vol. 33, 2302–2310 (1968), incorporated herein by reference. According to Urry, "Hexafluoroacetone gives stepwise reactions with olefins

Figure 2:
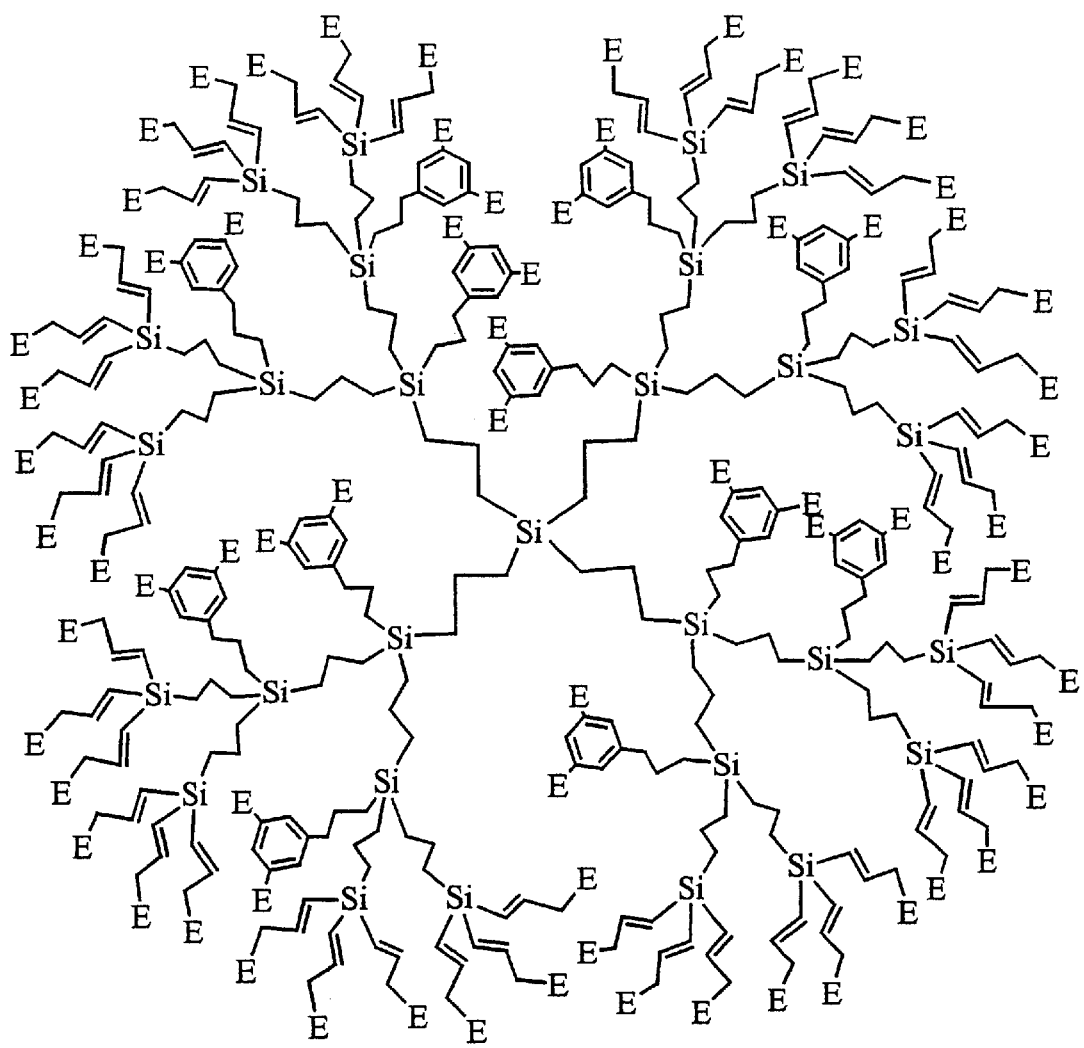
FIG. 2 shows another example of a dendrimeric compound of the invention, here, a carbosilane dendrimer with fluoroalcohol functionalized phenyl (interior) and allyl (terminal) end groups.

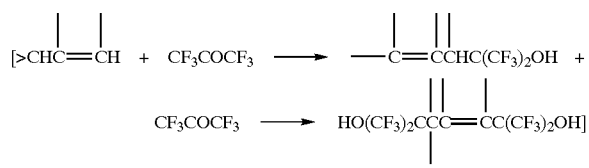

some of which, surprisingly, occur at 25°C." Two such dendrimeric compounds of the invention are shown in FIGS. 1 and 2. Using known methods (see, for example, Van der Made, A. W., Van Leeuwen, P. W. N. M., *J. Chem. Soc., Chem Commnun.*, 1992, 1400 and Ropartz, L.; Morris, R. E.; Foster, D. F; Cole-Hamilton, D. J., *J. Chem. Soc.*, 2001, 361) these compounds are typically synthesized in high yield.

Once synthesized, these dendrimeric compounds can be coated to a controlled film thickness on a substrate, either alone or mixed with a solvent or similarly functionalized polymer. Useful substrates include planar chemical sensors, such as surface acoustic wave (SAW) substrates; silica optical fibers; microcantilevers and other MEMS devices, and the interior surfaces of silica capillaries. The substrate chosen is based on the sensing mechanism being used.

The principle of operation of an acoustic wave device transducer involves the production of an acoustic wave that is generated on the surface or through the bulk of a substrate material and allowed to propagate. To generate an acoustic wave typically requires a piezoelectric material. Applying a time varying electric field to the piezoelectric material will cause a synchronous mechanical deformation of the substrate with a coincident generation of an acoustic wave in the material. The time varying electric field is generated in the surface by applying a time varying electrical field through one or more electrodes, which are connected to the piezoelectric material via one or more metal wire bonds and to an electrical circuit. Another electrode or electrodes receives the wave at a distance from the first electrode or electrodes. The second electrode or electrodes is also connected via metal wire bonds to the electrical circuit and the piezoelectric material. Such devices are operable in a frequency range of about 2 kilohertz to 10 gigahertz, preferably from about 0.2 megahertz to about 2 gigahertz and, more preferably, in the range of between about 200 to 1000 megahertz.

For piezoelectric sensors, piezoelectric substrates well-known in the art, such as ST-cut quartz, are useful in accordance with the invention. In addition to quartz crystals, piezoelectric ceramics, such as those of the barium titanate and lead zirconium titanate families, are suitable substrates. These include, for example, LiNbO$_3$; BaTiO$_3$; 95 wt. % BaTiO$_3$/5% GaTiO$_3$; 80 wt. % BaTiO$_3$/12% PbTiO$_3$/8% CaTiO$_3$; PbNb$_2$O$_6$; Na$_{0.5}$K$_{0.5}$NbO$_3$; Pb$_{0.94}$Sr$_{0.06}$(Ti$_{0.84}$Sr$_{0.52}$)O$_3$; and Pb$_{0.94}$(Ti$_{0.48}$Sr$_{0.52}$)O$_3$. In some cases, the substrate may comprise a piezoelectric coating material, such as ZnO or AlN, applied to a non-piezoelectric material, such as silicon. The piezoelectric properties of these and other suitable materials are provided in *CRC Handbook of Materials Science*, Vol. III, Charles T. Lynch, CRC Press: Boca Raton, 198 (1975).

The sensing portion of an acoustic wave device of the invention is the area under the chemoselective layer where the chemoselective layer covers the transducer. The area of the sensing portion of such a device can be on the order of cm$^2$ to $\mu$m$^2$.

An optical waveguide chemical sensor consists of a light source, an optical waveguide, a chemoselective film or layer, and a detector to analyze the light after interacting with the layer. The waveguide is used to propagate light to a sensing portion of the device that contains the chemoselective layer. The light travels towards this coating and interacts with it. If the analyte being detected is present in the layer, the optical characteristics of the light may be altered, and the change is detected by an optically sensitive detector.

Useful optical chemical sensors, commonly referred to as optrodes, typically include light sources such as semiconductor lasers, light-emitting diodes, or halogen lamps; optical waveguides such as fiber optics or planar waveguide substrates; chemoselective layers deposited on the sensing portion of the optrode exposed to an analyte; and detectors for monitoring the optical characteristics of an optrode. Sorption of the analyte to the chemoselective layer modifies the optical characteristics of the optrode, and this is usually detected as a change in refractive index or light intensity at one or more wavelengths of light. Thus, for optical sensors, both optical fibers and optical wave-guides are known in the art and useful in the invention.

Fiber optic waveguides for sensor applications are commonly manufactured from silica glass or quartz as the core of the fiber. Surrounding this core is a cladding material that exhibits a lower refractive index than the core to achieve internal reflectance. Chemoselective layers are typically applied at the distal tip of a fiber optic or along the side of the fiber optic where a portion of the cladding material has been removed.

Planar waveguide optical sensors use planar substrate devices as light guides. The use of a planar waveguide normally involves the use of evanescent wave techniques to take advantage of the large active surface area available. Many of these sensors use the fluorescent properties of a chemoselective layer and are thus called Total Internal Reflection Fluorescence (TIRF) sensors.

Preferably, acoustic wave devices are used as the substrate for the device of the invention. Particularly preferred are SAW devices such as 915 MHz two-port resonators made of ST-cut quartz with aluminum metallization and a thin silicon dioxide overcoat. SAW resonators and oscillator electronics to drive them are commercially available from RFM Incorporated, Dallas, Tex.

Before applying a coating to form the sensor portion of the device of the invention, the substrate is usually cleaned. The cleaning procedure typically involves rinsing the device in an organic solvent and then subjecting it to plasma cleaning, as is well-known. Optionally, the substrate can be silanized with a material such as diphenyltetramethyldisilazane (DPTMS) by immersing the cleaned substrate surface in liquid DPTMS and then placing the immersed surface into a partially evacuated chamber heated to about 170° C. for about 12 hours. The silanized substrate is then removed and solvent cleaned with, for example, toluene, methanol, chloroform, or a physical or serial combination thereof, before applying the sensor layer of the device.

The method used for coating the compounds of the invention onto a substrate is not critical, and various coating methods known in the art may be used. Typically, the coating is applied to the substrate in solution, either by dipping, spraying or painting, preferably by an airbrush or spin coating process. Laser deposition techniques may also be used, particularly when coating MEMS devices. The concentration of the compound of the invention in the coating solution should be sufficient to provide the viscosity most appropriate for the selected method of coating, and may easily be determined empirically.

The solvent used, although not critical, should be sufficiently volatile as to facilitate quick and easy removal, but not so volatile as to complicate the handling of the coating solution prior to being deposited on the substrate. Examples of useful organic solvents include, for example, hexane, chloroform, dichloromethane, toluene, xylenes, acetonitrile and tetrahydrofuran. J. W. Grate and R. A. McGill in *Analytical Chemistry*, Vol. 67, No. 21, 4015–19 (1995), the subject of which is hereby incorporated by reference, describe making chemical acoustic wave detectors by applying a thin film to a surface acoustic wave device. The thickness of the chemoselective layer preferably does not exceed that which would reduce the frequency of a chemical sensor operating at 250 megahertz by about 250 kilohertz and, typically, is in the range of about 0.5 nm to 10 microns, preferably in the range of about 5 to 500 nm.

The coating may comprise a single layer or multiple layers. With multiple layers, a layer containing the compound of the invention may be combined with at least one other layer that provides pores suitable for physically eliminating some chemical species of large size that are not to be monitored.

The process of sorption plays a key role in the performance of chemical sensors for gas phase analysis. For example, microsensors, which consist of a physical transducer and a selective sorbent layer, sense changes in the physical properties, such as mass, of the sorbent layer on the surface of the transducer, due to the sorption of analyte molecules from the gas phase into the sorbent layer. Coating properties that are known to elicit a detectable SAW sensor response are mass (i.e., as determined by the thickness and density of the coating), elasticity, viscoelasticity, conductivity, and dielectric constant. Changes in these properties can also result in changes in the attenuation (i.e., loss of acoustic power) of the wave. In some situations, monitoring the attenuation may be preferable to monitoring the velocity of a wave. Alternatively, there are some situations where simultaneously monitoring both velocity and attenuation can be useful. In any event, it is the modification of the sensed properties of the sorbent layer, as a result of sorption, that results in the detection of analyte molecules in the gas phase. SAW devices coated with compounds of the invention are capable of detecting mass changes as low as about 100 $pg/mm^2$. The vapor diffusion rate into and out of the polymer film is generally rapid, but does depend upon the thickness of the polymer film.

Sensor selectivity, the ability to detect a chemical species in an environment containing other chemical species, is generally determined by the ability of the coated layer to specifically sorb the species to be detected to the exclusion of almost all others. For most coatings, selectivity is obtained based on providing stronger chemical interactions between the coated layer and the target species than occurs between the layer and species that are not to be detected. The method of selectively detecting the presence of a chemical entity within an environment comprises (a) placing the sensing portion of the device of the invention in the environment and (b) detecting changes in the coated layer of the sensing portion of the device. The environment may be gaseous or liquid.

More than one device may be provided. For example, a plurality of sensor portions could be used in a sensor array with, e.g., associated control devices and software, in a manner similar to conventional procedures employing sensor arrays.

After an initial sensing has taken place, the coated sensor layer can be purged or cleaned by a second stream, allowing the sensing of a new third stream to take place. For example, water- or acid-base solutions could be used as purging or cleaning solutions, depending upon the species being detected and the nature of the layer.

In the devices and methods of the invention, the compounds are good sorbents for basic vapors (e.g. organophosphorus nitro-substituted compounds, such as explosives). It is expected that the devices of the invention could weigh about 0.5 to 5 pounds and could, therefore, be easily mounted on a remote or robotic vehicle for automatically detecting toxic chemicals or buried explosives or munitions. Alternatively, such a device would also be useful for remotely detecting explosives vapors emitting from a person intending the destruction of private property and/or personnel, such as, for example, at crowded public places like airports or arenas where terrorist activity may be suspected.

If desired, it is possible to increase the concentration of explosive vapors contained in the area being monitored, i.e., speed up their release from buried or otherwise hidden munitions or explosives, by irradiating the area with electromagnetic radiation. For example, a beam-forming antenna could be employed to direct high-frequency to long wavelength microwave radiation at the area suspected of containing buried munitions, such as landmines. This will gently warm the area being checked and increase explosive vapor leakage prior to testing with the device of the invention. Increasing the concentration of vapor in the soil or other environment surrounding a munition will produce a stronger signal following the reaction with the sensor portion of the device of the invention.

The chemoselective, dendrimeric compounds of the invention exhibit high selectivity and sensitivity toward hydrogen bond basic vapors, due to the sensitivity and selectivity of the halogen substituted alcohol functional groups that are present. The functionalized dendrimeric compounds of the invention also have the advantage of high-yield preparation methods, ready purification, in addition to having an increased availability of functional groups to analytes, as compared with linear polymeric coatings. Moreover, the flexibility in the synthesis of these materials allows one to tailor a wide variety of related chemoselective dendrimeric compounds.

EXAMPLES

Unless otherwise noted, all synthetic procedures were carried out under inert atmosphere using standard Schlenk and vacuum line techniques. Solvents were dried and degassed under an argon atmosphere using appropriate drying agents.

Example 1

Preparation of $Si\{CH_2CH_2CH_2[SiCH_2CH_2CH_2(SiCH_2CH_2CH_2C(CF_3)_2OH)_3]_3\}_4$ The dendrimer $Si\{CH_2CH_2CH_2[SiCH_2CH_2CH_2(SiCH_2CH=CH_2)_3]_3\}_4$ was prepared according to literature procedures (Van der Made, A. W., Van Leeuwen, P. W. N. M., *J. Chem. Soc., Chem Commun.*, 1992, 1400). A sample of the dendrimer (1.0 g) was placed into a mild steel cylinder along with a magnetic stir bar and a catalytic amount of aluminum chloride (0.1 g). The steel cylinder was then evacuated and cooled in liquid nitrogen. Hexafluoroacetone (2.0 g) was introduced into the steel cylinder via vacuum transfer. The cylinder was sealed, removed from the vacuum line, and heated to 75° C. for 48 hours. The cylinder was then cooled to room temperature, and the volatiles removed under vacuum. Once evacuated, the reaction cylinder was opened to the air, and the dendrimeric compound inside was extracted with chloroform (4×30 mL). The resulting solution was washed with water (3×50 mL), filtered, and the solvent removed to give a pale brown polymer. FTIR (NaCl, cm$^{-1}$) showed the characteristic OH stretch (3510 cm$^{-1}$) verifying the presence of the —C(CF$_3$)$_2$OH groups in the product.

Example 2

Preparation of Si $\{CH_2CH_2CH_2Si[CH_2CH_2CH_2Si(CH_2CH_2CH_2C_6H_3(C(CF_3OH)_2)_3]_3\}_4$ The dendrimer $Si[CH_2CH_2CH_2Si(CH_2CH=CH_2)_3]_4$ was prepared according to literature procedures (Van der Made, A. W., Van Leeuwen, P. W. N. M., *J. Chem. Soc., Chem Commun.*, 1992, 1400). A solution of $Si[CH_2CH_2CH_2Si(CH_2CH=CH_2)_3]_4$ (2.0 g) in tetrahydrofuran (THF, 30 mL) was treated with an excess of HSiCl$_3$ and three drops of a 0.1 mM solution of H$_2$PtCl$_6$ in THF. The resulting solution was stirred for 32 hours at 40° C. The volatiles were removed, and the resulting residue was dissolved in fresh THF (30 mL). The reaction solution was then cooled in an ice bath and treated with a 5% mole excess of phenpropylmagnesium bromide (prepared from 1-bromo-3-phenylpropane and magnesium in diethyl ether). The solution was allowed to stir at room temperature for 8 hours and then heated to 40° C. for three hours. The solution was cooled in an ice bath and treated with saturated NH$_4$Cl$_{(aq)}$. The organic layer was separated, washed with water (3×40 mL), dried over MgSO$_4$ and filtered through Celite. Evaporation of the solvent left Si $\{CH_2CH_2CH_2Si[CH_2CH_2CH_2Si(CH_2CH_2CH_2C_6H_5)_3]_3\}_4$ as a viscous oil.

A sample of Si $\{CH_2CH_2CH_2Si[CH_2CH_2CH_2Si(CH_2CH_2CH_2C_6H_5)_3]_3\}_4$ (1.5 g) was placed into a mild steel cylinder along with a magnetic stir bar and a catalytic amount of aluminum chloride (0.2 g). The steel cylinder was then evacuated and cooled in liquid nitrogen. Hexafluoroacetone (~2.0 g) was introduced into the steel cylinder via vacuum transfer. The cylinder was sealed, removed from the vacuum line and heated to 75° C. for 48 hours. The cylinder was then cooled to room temperature and the volatiles removed under vacuum. Once fully evacuated, the reaction cylinder was opened to the air, and the dendrimeric product was extracted with chloroform (4×30 mL). The resulting solution was washed with water (3×50 mL), filtered, and the solvent removed to give a pale brown product. FTIR (NaCl, cm$^{-1}$) showed the characteristic OH stretch (3510 cm$^{-1}$) verifying the presence of the —C(CF$_3$)$_2$OH groups in the product.

Example 3

Preparation of Si $\{CH_2CH_2CH_2Si[CH_2CH_2CH_2Si(CH_2CH_2CH_2C_6H_3(CF_3)OH)_2)_3]_3\}_8O_{12}$ A solution of octavinylsilsesquioxane (2.0 g) in tetrahydrofuran (THF, 50 mL) was treated with excess of HSiCl$_3$ and two drops of a 0.1 mM H$_2$PtCl$_6$ solution in THF. The resulting mixture was allowed to stir for 48 hours at room temperature. The volatiles were removed under vacuum, leaving a pale yellow solid. The solid was dissolved in THF (30 mL), cooled in an ice bath and treated with 26 mL of allylmagnesium bromide (1.0 M in hexanes). The resulting slurry was stirred for 20 hours at room temperature then heated to 40° C. for 4 hours. The solution was then cooled in an ice bath and treated with saturated NH$_4$Cl$_{(aq)}$. The organic layer was separated and washed with water (3×50 mL), dried over MgSO$_4$ and filtered through Celite. Removal of the solvent under vacuum left Si$_8$[CH$_2$CH$_2$Si(CH$_2$CH=CH$_2$)$_3$]$_8$O$_{12}$.

A solution of Si$_8$(CH$_2$CH$_2$Si(CH$_2$CH=CH$_2$)$_3$)$_8$O$_{12}$ (1.0 g) in THF (50 mL) was treated with excess HSiCl$_3$ and two drops of a 0.1 mM H$_2$PtCl$_6$ solution in THF. The resulting mixture was allowed to stir for 48 hours at room temperature. The volatiles were removed under vacuum, leaving a pale yellow solid. The solid was dissolved in THF (30 mL), cooled in an ice bath, and treated with 5% mol excess of phenpropylmagnesium bromide (prepared from 1-bromo-3-phenylpropane and magnesium in diethyl ether). The resulting slurry was stirred for 18 hours at room temperature and then heated to 40° C. for 3 hours. The solution was next cooled in an ice bath and treated with saturated NH$_4$Cl$_{(aq)}$.

The organic layer was separated and washed with water (3×50 mL), dried over $MgSO_4$, and filtered through Celite. Removal of the solvent under vacuum left the product $Si_8\{CH_2CH_2Si[CH_2CH_2CH_2Si(CH_2CH_2CH_2C_6H_5)_3]_3\}_8O_{12}$.

A sample of $Si_8\{CH_2CH_2Si[CH_2CH_2CH_2Si(CH_2CH_2CH_2C_6H_5)_3]_3\}O_{12}$ (1.0 g) was placed into a mild steel cylinder; along with a magnetic stir bar. The steel cylinder was then evacuated and cooled in liquid nitrogen. Hexafluoroacetone (2.0 g) was introduced into the steel cylinder via vacuum transfer. The cylinder was sealed, removed from the vacuum line, and heated to 75° C. for 60 hours. The cylinder was then cooled to room temperature, and the volatiles were removed under vacuum. Once fully evacuated, the reaction cylinder was opened to the air; and the product was extracted with chloroform (4×30 mL). The resulting solution was washed with water (3×50 mL), filtered, and the solvent removed to give a pale brown product. FFIR (NaCl, $cm^{-1}$) showed the characteristic OH stretch (3510 $cm^{-1}$) verifying the presence of the $—C(CF_3)_2$ OH groups in the final product.

Example 4

Preparation of Si $\{CH_2CH_2CH_2Si[CH_2CH_2CH_2Si(CH_2CH_2CH_2C_6H_3(C(CF_3)_2OH)_2][CH_2CH_2CH_2Si(CH_2CH_2CH_2C_6H_3(C(CF_3)_2OH)_2)(CH=CHCH_2(CF_3)_2]_2\}_4$ The dendrimer $Si[CH_2CH_2CH_2Si(CH_2CH_2CH_2C_6H_5)(CH_2CH=CH_2)_2]_4$ was prepared by the reaction of tetraallylsilane (3.0 g) in THF (50 mL) with four equivalents of phenpropyldichlorosilane (prepared from 3-phenylpropylmagnesium bromide and excess $HSiCl_3$) in the presence of a catalytic amount of $H_2PtCl_6$. The solution was stirred at room temperature for 48 hours. The solution was then cooled to 0° C. and treated with 125 mL of allylmagnesium bromide (1.0 M in hexanes). The resulting solution was allowed to stir at room temperature for 8 hours and then heated to 40° C. for three hours. After cooling to room temperature, the solution was cooled in an ice bath and treated with saturated $NH_4Cl_{(aq)}$. The organic layer was separated, washed with water (3×40 mL), dried over $MgSO_4$ and filtered through silica gel. Evaporation of the solvent left $SiCH_2CH_2CH_2Si(CH_2CH_2CH_2C_6H_5)(CH_2CH=CH_2)_2]_4$ as a viscous oil.

A solution of $Si[CH_2CH_2CH_2Si(CH_2CH_2CH_2C_6H_5)(CH_2CH=CH_2)_2]_4$ (40 g) in tetrahydrofuran (THF, 30 mL) was treated with eight equivalents of phenpropyldichlorosilane (prepared from 3-phenylpropylmagnesium bromide and excess $HSiCl_3$) and three drops of a 0.1 mM solution of $H_2PtCl_6$ in THF. The resulting solution was stirred for 32 hours at room temperature. The solution was then cooled to 0° C. and treated with 58 mL of allylmagnesium bromide (1.0 M in hexanes). The resulting solution was allowed to stir at room temperature for 8 hours and then heated to 40° C. for three hours. After cooling to room temperature, the solution was cooled in an ice bath and treated with saturated $NH_4Cl_{(aq)}$. The organic layer was separated, washed with water (3×40 mL), dried over $MgSO_4$ and filtered through silica gel. Evaporation of the solvent left $Si\{CH_2CH_2CH_2Si(CH_2CH_2CH_2C_6H_5)[CH_2CH_2CH_2Si(CH_2CH_2CH_2C_6H_5)(CH_2CH_2CH=CH_2)_2]_2\}_4$ as a viscous oil.

A sample of $Si\{CH_2CH_2CH_2Si(CH_2CH_2CH_2C_6H_5)[CH_2CH_2CH_2Si(CH_2CH_2CH_2C_6H_5)(CH_2CH=CH_2)_2]_2\}_4$ (5.0 g) was placed into a mild steel cylinder along with a magnetic stir bar and a catalytic amount of aluminum chloride (0.2 g). The steel cylinder was then evacuated and cooled in liquid nitrogen. Hexafluoroacetone (2.5 g) was introduced into the steel cylinder via vacuum transfer. The cylinder was sealed, removed from the vacuum line and heated to 75° C. for 48 hours. The cylinder was then cooled to room temperature and the volatiles removed under vacuum. Once fully evacuated, the reaction cylinder was opened to the air and the dendrimeric product was extracted with chloroform (4×30 mL). The resulting solution was washed with water (3×50 mL), filtered through Celite, and the solvent removed to give a pale brown product. FTIR (NaCl, $cm^{-1}$) showed the characteristic OH stretch (3510 $cm^{-1}$) verifying the presence of the $—C(CF_3)_2OH$ groups in the final product.

Example 5

Preparation of $Si\{CH_2CH_2CH_2Si(CH_2CH_2CH_2C_6H_3(C(CF_3)_2OH)_2OH)_2[CH_2CH_2Si(CH_2CH_3)_3]_2\}_4$ The dendrimer $SiCH_2CH_2CH_2Si(CH_2CH_2CH_2C_6H_5)(CH_2CH=CH_2)_2)_2]_4$ was prepared by the reaction of tetraallylsilane (3.0 g) in THF (50 mL) with four equivalents of phenpropyldichlorosilane (prepared from 3-phenylpropylmagnesium bromide and excess $HSiCl_3$) in the presence of a catalytic amount of $H_2PtCl_6$. The solution was stirred at room temperature for 48 hours. The solution was then cooled to 0° C. and treated with 125 mL of allylmagnesium bromide (1.0 M in hexanes). The resulting solution was allowed to stir at room temperature for 8 hours and then heated to 40° C. for three hours. After cooling to room temperature, the solution was cooled in an ice bath and treated with saturated $NH_4Cl_{(aq)}$. The organic layer was separated, washed with water (3×40 mL), dried over $MgSO_4$ and filtered through silica gel. Evaporation of the solvent under vacuum left $Si[CH_2CH_2CH_2Si(CH_2CH_2CH_2C_6H_5)(CH_2CH=CH_2)_2]_4$ as a viscous oil.

A solution of $Si[CH_2CH_2CH_2Si(CH_2CH_2CH_2C_6H_5)(CH_2CH=CH_2)_2]_4$ (3.0 g). In tetrahydrofuran (THF, 30 mL) was treated with excess $HSiCl_3$ (10 mL) and three drops of a 0.1 mM solution of $H_2PtCl_6$ in THF. The resulting solution was stirred for 32 hours at room temperature. Volatiles were then removed under vacuum and the remaining residue dissolved in THF (30 mL). The solution was then cooled to 0° C. and treated with 35 mL of ethylmagnesium chloride (2.0 M in diethyl ether). The resulting solution was allowed to stir at room temperature for 8 hours and then heated to 40° C. for three hours. After cooling to room temperature, the solution was cooled in an ice bath and treated with saturated $NH_4Cl_{(aq)}$. The organic layer was separated, washed with water (3×40 ml) dried over $MgSO_4$ and filtered through silica gel. Evaporation of the solvent under vacuum left $Si\{CH_2CH_2CH_2Si(CH_2CH_2CH_2C_6H_5)[CH_2CH_2CH_2Si(CH_2CH_3)_3]_2\}_4$ as a viscous oil.

A sample of $Si\{CH_2CH_2CH_2Si(CH_2CH_2CH_2C_6H_5)[CH_2CH_2CH_2Si(CH_2CH_3)_3]_2\}_4$ (3.0 g) was placed into a mild steel cylinder along with a magnetic stir bar and a catalytic amount of aluminum chloride (0.2 g). The steel cylinder was then evacuated and cooled in liquid nitrogen. Hexafluoroacetone (2.5 g) was introduced into the steel cylinder via vacuum transfer. The cylinder was sealed, removed from the vacuum line and heated to 75° C. for 48 hours. The cylinder was then cooled to room temperature and the volatiles removed under vacuum. Once fully evacuated, the reaction cylinder was opened to the air and the dendrimeric product was extracted with chloroform (4×30 mL). The resulting solution was washed with water (3×50 mL), filtered through Celite, and the solvent removed to give a pale brown product. FTIR (NaCl, cm$^{-1}$) showed the characteristic OH stretch (3510 cm$^{-1}$) verifying the presence of the —C(CF$_3$)$_2$OH groups in the final product.

Example 6

Applying a Thin Film to a SAW Device

SAW devices are cleaned in a Harrick plasma cleaner prior to polymer film application. Spray-coated films of the compound of FIG. 1 in chloroform (1% by weight) are applied to a SAW device using an airbrush supplied with compressed dry nitrogen. The frequency change of the SAW device operating in an oscillator circuit is monitored during deposition, using the change in frequency, typically about 250 kHz, as a measure of the amount of material applied. After application, the films are optionally annealed in an oven at 50° C. overnight. Spray-coated films are examined by optical microscopy with a Nikon microscope using reflected light Nomarski differential interference contrast.

Example 7

Detection of Basic Vapors with a Compound-Coated SAW Device

The compounds of FIGS. 1 and 2 are separately applied to SAW devices and tested against organic vapors at various concentrations. Upon exposure to a vapor, the coated acoustic wave devices undergo a shift in frequency that is proportional to the concentration of the vapor. Times to steady state response, corresponding to equilibrium partitioning of the vapor into the compound layer, are typically under 10 seconds using a vapor delivery system. From frequency shift data for a vapor at multiple concentrations, calibration curves are constructed. The calibration curves are generally linear at moderate concentrations, but deviate from linearity at the high and low concentrations levels. Linear calibration curves are consistent with hydrogen-bonding interactions at a finite number of sites in the compound.

Example 8

Coating a Capillary Column

A solution of the compound of FIG. 2 in chloroform is used to coat the interior surface of several one-meter silica capillary columns with an inside diameter of 100 microns. The procedure to coat a 100-micron i.d. column from Fused Silica Intermediate Polarity (part number 2-5745, Supelco, Pa.) involves filling the capillary with a solution of the compound, closing one end of the capillary, and pulling a vacuum off the other end of the capillary at a fixed temperature. The solution-filled column is placed into a gas chromatographic oven stabilized at 30° C. to control the temperature. A vacuum is then pulled using an oil-free Teflon-coated diaphragm pump (Fisher part number 13-875-217C), with a vacuum of 70 kPa, typically being applied for about 15–20 hours.

The thickness and thickness uniformity are verified by cutting a coated column into several pieces and looking at the cross sections using a high power optical microscope. The thickness of one micron is usually in good agreement with the theoretical film thicknesses.

Example 9

Optical Fiber Drawing and Cladding

The compound of FIG. 2 is combined with a solvent to form a viscous mixture, which is stirred until well-blended and degassed under vacuum. The viscous mixture is applied to a fused silica fiber as it is freshly drawn from a Heathway fiber drawing apparatus through a 2–5 mm Sandcliff cladding cup, and into a 45 cm long clamshell furnace for curing. The viscous mixture is supplied to the cladding cup under a pressure of about 0.8 to about 1.5 psi. The optimal furnace temperature and fiber draw speed are typically about 520° C. and 8–9 m/min, respectively. These relatively slow draw rates are usually used for manual control of the drawing conditions, but sometimes result in variable core diameters and coating thickness. However, when used with the other conditions described, a fairly uniform coating that is light yellow in color and slightly tacky to the touch is usually obtained. As the viscosity of the solution of the compound increases during the fiber drawing, the delivery pressure should be increased over the course of filling, usually about two hours.

Half-meter to one-meter sections are hand selected for quality. The best fiber sections made under these conditions have a smooth coating of about 25 microns thick over a 180-micron diameter core. All are usually effective in guiding light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A dendrimeric compound comprising:
a core portion;
at least one arm extending radially from said core portion;
at least one branch extending from each said arm; and
each said arm having at least one halogen substituted alcohol positioned at the terminus of at least one of said branches.

2. The compound of claim 1, wherein at least one of said branches has an unsaturated group positioned adjacent to said halogen substituted alcohol.

3. The compound of claim 1, wherein said core portion is selected from the group consisting of hydrocarbons, siloxanes, carbosilanes, silylene moiety, and combinations thereof.

4. The compound of claim 1, wherein said core portion is selected from the group consisting of Si-alkylene, Si-arylene, or —Si-alkenylene, and combinations thereof.

5. The compound of claim 1, wherein said arm contains one or more heteroatoms and has at least one bond selected from the group consisting of double, triple, and aromatic ring.

6. The compound of claim 1, wherein said arm contains at least one constituent selected from the group consisting of —Si-[alkylene-Si-(alkenylene)$_3$]$_3$ and —Si-[alkylene-Si-(alkylene-arylene)$_3$]$_3$.

7. A solution for preparing a chemical vapor sensor comprising:
an amount of a dendrimeric compound having:
a core portion;
at least one arm extending radially from said core portion;
at least one branch extending from each said arm;
each said arm having at least one halogen substituted alcohol positioned at the terminus of at least one of said branches;

effective to enhance the sensitivity of said sensor to hydrogen bond accepting vapors and nitroaromatic compounds; and a solvent for said compound.

8. The solution of claim 7, wherein at least one of said branches has an unsaturated group positioned adjacent to said halogen substituted alcohol.

9. The solution of claim 7, wherein said core portion is selected from the group consisting of hydrocarbons, siloxanes, carbosilanes, silylene moiety, and combinations thereof.

10. The solution of claim 7, wherein said core portion is selected from the group consisting of Si-alkylene, Si-arylene, —Si-alkenylene, and combinations thereof.

11. The solution of claim 7, wherein said arm contains one or more heteroatoms and has at least one bond selected from the group consisting of double, triple, and aromatic ring.

12. The solution of claim 7, said arm contains at least one constituent selected from the group consisting of —Si-[alkylene-Si-(alkenylene)$_3$]$_3$ and —Si-alkylene-Si-(alkylene-arylene)$_3$]$_3$.

13. The solution of claim 7, wherein said solvent is selected from the group consisting of hexane, chloroform, dichloromethane, toluene, xylenes, acetonitrile, and tetrahydrofuran.

14. A device for selective molecular recognition, said device comprising a sensing portion, wherein said sensing portion includes a substrate having coated thereon a layer, said layer comprising a dendrimeric compound having:

a core portion;

at least one arm extending radially from said core portion;

at least one branch extending from each said arm;

each said arm having at least one halogen substituted alcohol positioned at the terminus of at least one of said branches.

15. The device of claim 14, wherein said substrate is a surface acoustic wave (SAW) substrate.

16. The device of claim 14, wherein at least one of said branches has an unsaturated group positioned adjacent to said halogen substituted alcohol.

17. The device of claim 14, wherein said core portion is selected from the group consisting of hydrocarbons, siloxanes, carbosilanes, silylene moiety, and combinations thereof.

18. The device of claim 14, wherein said core portion is selected from the group consisting of Si-alkylene, Si-arylene, or —Si-alkenylene, and combinations thereof.

19. The device of claim 14, wherein said arm contains one or more heteroatoms and has at least one bond selected from the group consisting of double, triple, and aromatic ring.

20. The device of claim 14, wherein said arm contains at least one constituent selected from the group consisting of —Si-[alkylene-Si-(alkenylene)$_3$]$_3$, —Si[alkylene-Si-(alkylene-arylene)$_3$]$_3$, alkylene, arylene, and —Si-alkylene-Si.

21. A method of detecting the molecules of a hydrogen bond accepting vapor, comprising the steps of:

(a) contacting the molecules of said vapor with a device comprising a sensing portion, wherein said sensing portion includes a substrate having coated thereon a layer, said layer comprising a dendrimeric compound having:

a core portion;

at least one arm extending radially from said core portion;

at least one branch extending from each said arm; and each said arm having at least one halogen substituted alcohol positioned at the terminus of at least one of said branches;

(b) collecting said molecules on said layer, wherein said molecules alter a specific physical property of said layer; and (c) detecting the amount of change in the physical property from before said contacting step (a) and after said collecting step (b).

22. The method of claim 21 wherein said substrate is a surface acoustic wave (SAW) substrate.

23. The method of claim 21, wherein at least one of said branches has an unsaturated group positioned adjacent to said halogen substituted alcohol.

24. The method of claim 21, wherein said core portion is selected from the group consisting of hydrocarbons, siloxanes, carbosilanes, silylene moiety, and combinations thereof.

25. The method of claim 21 wherein said core portion is selected from the group consisting of Si-alkylene, Si-arylene, or —Si-alkenylene, and combinations thereof.

26. The method of claim 21 wherein said arm contains one or more heteroatoms and has at least one bond selected from the group consisting of double, triple, and aromatic ring.

27. The device of claim 21 wherein said arm contains at least one constituent selected from the group consisting of —Si-[alkylene-Si-(alkenylene)$_3$]$_3$, —Si-[alkylene-Si-(alkylene-arylene)$_3$]$_3$, alkylene, arylene, and —Si-alkylene-Si.

* * * * *